United States Patent
Haapalahti et al.

(10) Patent No.: US 10,072,686 B2
(45) Date of Patent: Sep. 11, 2018

(54) FASTENER AND METHOD FOR ATTACHING THE FASTENER TO A GLAZING ELEMENT

(71) Applicant: Suomen Visor Oy, Kempele (FI)

(72) Inventors: Teuvo Haapalahti, Oulunsalo (FI); Markku Lehtonen, Kuusankoski (FI); Markku Pulkkinen, Tupos (FI); Chad Simonson, Kempele (FI)

(73) Assignee: Suomen Visor Oy, Kempele (FI)

( * ) Notice: Subject to any disclaimer, the term of this patent is extended or adjusted under 35 U.S.C. 154(b) by 450 days.

(21) Appl. No.: 14/743,432

(22) Filed: Jun. 18, 2015

(65) Prior Publication Data
US 2015/0369268 A1 Dec. 24, 2015

(30) Foreign Application Priority Data
Jun. 18, 2014 (FI) ...................................... 20145585

(51) Int. Cl.
*E06B 9/266* (2006.01)
*E06B 9/38* (2006.01)
(Continued)

(52) U.S. Cl.
CPC .............. *F16B 2/245* (2013.01); *E06B 9/266* (2013.01); *E06B 9/42* (2013.01); *F16B 2/248* (2013.01);
(Continued)

(58) Field of Classification Search
CPC .................................. E06B 9/38; E06B 9/266
(Continued)

(56) References Cited

U.S. PATENT DOCUMENTS

| 2,896,893 A * | 7/1959 | Oliver | ..................... E06B 9/325 160/178.1 R |
| 5,000,242 A | 3/1991 | Coddens | |

(Continued)

FOREIGN PATENT DOCUMENTS

| CN | 201723132 U | 1/2011 |
| DE | 4115577 C1 | 9/1992 |

(Continued)

OTHER PUBLICATIONS

European Search Report, European Patent Application No. 15170797.3, dated Nov. 13, 2015.
Search Report for FI 20145585 dated Feb. 5, 2015.

*Primary Examiner* — Frederick L Lagman
(74) *Attorney, Agent, or Firm* — Andrus Intellectual Property Law, LLP

(57) ABSTRACT

The fastener is intended to be attached to a glazing element, which has a glass sheet and at least one frame part setting against the surface of the glass sheet. The fastener has a support part and a fastening element to be inserted into the gap between the glass sheet and frame. The fastening element comprises a locking element for locking to the surface of the frame part facing the glass sheet. The fastener installed in place remains in place in the gap between the frame part and glass sheet by means of the locking element without any other attachment elements. The locking element can be a locking projection turning to an angle from the plane of the fastening element, a flexible locking tongue turning to an angle from the plane of the fastening element or a rigid locking tip. The support part may comprise gripping means for attaching to the edge rail of the sunshade. In the method the fastener is attached to a glazing element so that at least part of the fastening element of the fastener is inserted into the gap between the glass sheet and frame (Continued)

part and by locking the fastening element to the surface of the frame part facing the glass sheet.

7 Claims, 2 Drawing Sheets

(51) Int. Cl.
    *F16B 2/24*     (2006.01)
    *E06B 9/42*     (2006.01)

(52) U.S. Cl.
    CPC ........... *E06B 9/38* (2013.01); *Y10T 29/49948* (2015.01); *Y10T 403/60* (2015.01)

(58) Field of Classification Search
    USPC .................................................. 160/178.1 R
    See application file for complete search history.

(56) References Cited

U.S. PATENT DOCUMENTS

| | | | | |
|---|---|---|---|---|
| 5,226,466 A | * | 7/1993 | Coddens | E06B 9/264 160/107 |
| 5,322,255 A | * | 6/1994 | Garrett | F16M 11/10 248/299.1 |
| 5,529,273 A | * | 6/1996 | Benthin | A47H 1/142 160/902 |
| 5,655,590 A | * | 8/1997 | Bryant | E06B 9/382 160/168.1 R |
| 6,039,295 A | | 3/2000 | de Beijer | |
| 6,119,756 A | * | 9/2000 | Tatro | E06B 9/264 160/107 |
| 8,919,417 B2 | * | 12/2014 | Wen | E06B 9/323 160/173 V |
| 2016/0186487 A1 | * | 6/2016 | Haapalahti | A47H 1/13 29/446 |

FOREIGN PATENT DOCUMENTS

| | | | |
|---|---|---|---|
| DE | 19548992 A1 | * 7/1996 | ............... A47H 1/10 |
| DE | 202004009270 | 9/2004 | |
| DE | 202007000447 | 5/2007 | |
| EP | 1464260 A1 | 10/2004 | |

* cited by examiner

FASTENER AND METHOD FOR ATTACHING THE FASTENER TO A GLAZING ELEMENT

CROSS-REFERENCE TO RELATED APPLICATIONS

This application claims priority to Finnish Patent Application No. 20145585, filed Jun. 18, 2014, which is incorporated herein by reference, in entirety.

FIELD

The object of the invention is a fastener for attaching to a glazing element including a glass sheet and at least one frame part setting against the surface of the glass sheet, said fastener comprising a support part and a fastening element insertable into the gap between the glass sheet and frame. The object of the invention is further a method for attaching the fastener to the glazing element.

BACKGROUND

Blinds are often used as sunshades in windows of glazed balconies and buildings to prevent the solar radiation from entering the balcony or room space. Sunshades are attached to an edge profile of the balcony glazing or frame parts of a window by fasteners, which comprise gripping means for attaching to the sunshade and a suspension element for attaching to the edge profile or frame.

Sunshades are often attached to the edge profiles of balcony glazing by metal fasteners, which at least in part circle around the edge profile of the glazing. Dirt and dust accumulate easily to such fasteners and especially in the gap between the fastener and the edge profile and this is difficult to remove. Suspension elements for sunshades to be installed in windows are generally attached to the frame by using screw fastening, which requires the use of tools in the installation phase. Screw fastening always leaves screw holes in the frames, which become visible when the sunshades are removed and/or changed. The patent specifications DE 4115577 and EP 1464260 describe brackets for curtain rods to be attached to a window, the brackets including a tongue pushed into the gap between the window's glass sheet and frame. Such fasteners are easily detached from the gap by pulling those outwards.

SUMMARY

An object of the invention is to introduce a fastener to be attached to a framed glazing element and a method for attaching the fastener, with which disadvantages and drawbacks relating to the prior art can be eliminated.

The objects of the invention are achieved by a fastener and method, which are characterized in what is disclosed in the independent claims. Some advantageous embodiments of the invention are shown in the dependent claims.

The object of the invention is to provide a fastener for attaching to a glazing element. The fastener is intended to be attached to a glazing element comprising a glass sheet and at least one frame part setting against the surface of the glass sheet. Glass sheet refers here to a sheet-type part manufactured of glass or transparent material substantially similar to glass. Frame part refers here to any edge profile to be attached to the edge of the glass sheet comprising a section setting against the surface of the glass sheet or a strip or profile to be installed against the surface of the glass sheet. The glazing element can thus be, for example, a balcony glazing comprising glass sheets, the upper and lower edges of which are provided with metal edge profiles. The glazing element can similarly be a window, the edges of which have a frame manufactured of wood or metal. The fastener according to the invention has a support part and a fastening element insertable into the gap between the glass sheet and frame. The fastening element has a locking element for locking to the surface of the frame part facing the glass sheet. The fastener installed in place remains in place in the gap between the frame part and glass sheet by means of the locking element without any other fastening means.

In an advantageous embodiment of the fastener according to the invention the locking element is a locking projection turning to an angle from the plane of the fastening element. In a fastener installed in place the fastening element sets in a position parallel to the plane of the glass sheet in the gap between the glass sheet and frame. In this case the locking projection turning to an angle from the plane of the fastening element faces towards the frame part and sets into a groove or recess in the surface of the frame part facing the gap, i.e. into the widest point of the gap. The length of the locking projection is bigger than the width of the gap, which prevents the pulling out of the fastener from the gap between the glass and frame part along a path parallel to the plane of the glass.

In a second embodiment of the fastener according to the invention the locking element is a flexible locking tongue turning to an angle from the plane of the fastening element. Upon installing the fastener in place, the flexible locking tongue is pressed into a position substantially parallel to the plane of the fastening element so that the fastening element fits to penetrate through the narrow gap between the glass sheet and frame part. When the locking tongue arrives at the groove or recess in the frame part, it returns to the original position turning to an angle from the plane of the fastening element. In the position turned to an angle the locking tongue prevents the pulling out of the fastener from the gap between the glass and frame part along a path parallel to the plane of the glass.

According to a third advantageous embodiment of the fastener according to the invention the locking element is a locking tip projecting from the plane of the fastening element. The locking tip preferably has an edge surface turning to an angle from the plane of the fastening element. Thus, the shape of the edge surface of the locking tip is substantially identical to the shape of an unloaded locking tongue. The locking tip differs from the operation of the locking tongue so that the locking tip does not significantly yield when the fastener is installed in place, i.e. the locking tip is a substantially rigid part. This embodiment of the fastener is suitable for being installed into such a glazing element, in which there is a flexible, compressible seal in the gap between the glass sheet and frame part. The fastening element is pushed from between the seal and frame part into the gap between the frame part and glass sheet so that the edge surface of the locking tip skids along the free edge of the frame part and forces the fastening element to press against the seal. When the locking tip arrives at the groove or recess in the surface of the frame part, the compression force of the compressed seal presses the locking tip of the fastening element into the groove or recess in the frame part and thus locks the fastener into place in the frame part.

In yet another advantageous embodiment of the fastener according to the invention the support part comprises gripping means for attaching to the edge rail of the sunshade. Sunshades typically have two edge rails, the first one of which is attached to the frame part in the upper edge of the glazing element and the second one is attached to the frame part in the lower edge of the glazing element. The fastener according to the invention can be used for fastening both the above mentioned edge rails, i.e. no other fastening elements are needed for attaching the sunshade. The support part may also comprise other connection surfaces or parts for receiving other parts belonging to the sunshade. The connection parts may be, for example, cord holders.

In yet another embodiment of the fastener according to the invention the said gripping means comprise first gripping means for attaching to the first edge of the edge rail and second gripping means for attaching to the second edge of the edge rail. Thus, the edge rail remains compressed between the first and second gripping means. Further, the support part preferably comprises at least one spring element between the first and second gripping means. The spring element makes it possible to temporarily increase the distance between the first and second gripping means by applying a force acting to different directions to the first and second gripping means, which makes it possible to install the edge rail between the gripping means. The edges of the gripping means can also be shaped so that the edge rail can be pressed between them and the gripping means bend slightly outwards during the pressing phase. The edge rail can then be fastened by "clicking" it to the support part.

The fastener according to the invention can be manufactured from any suitable material, such as metal or plastic. Preferably, the fastener is a one-piece part made by shaping from a sheet or wire, a part made by casting from a castable material, or a part made by cutting from a profile with a suitable cross-sectional form.

In the method of the object of the invention a fastener with a support part and fastening element is attached to a glazing element. The glazing element has a glass sheet and at least one frame part setting against the surface of the glass sheet. In the method at least part of the fastening element of the fastener is inserted into a gap between the glass sheet and frame part. It is characteristic for the method that the fastening element is locked to the surface of the frame part facing the glass sheet. The fastener installed in place remains in place in the glazing element without other fastening means. The fastening element is locked to the surface of the frame facing the glazing element, which is located in an invisible place in the gap between the glass sheet and frame.

In an advantageous embodiment of the method according to the invention the fastener with a locking projection in its fastening element is attached to a glazing element. The frame part of the glazing element facing the glass sheet is provided with an edge surface. The fastening element is inserted into the gap between the glass sheet and the frame part by pushing the fastener into the gap and by simultaneously rotating the fastener around an axis parallel to the longitudinal direction of the frame part so that the locking projection sets below said edge surface seen from the direction of the inlet of the gap. The locking projection prevents the fastener from being pulled out from the gap between the glass and the frame part along a path in the direction of plane of the glass. When necessary, the fastener can be detached from the gap between the glass sheet and frame by pulling and by simultaneously rotating the fastener to the opposite direction in relation to the installation situation.

In a second advantageous embodiment of the method of the invention the fastener with a locking projection in its fastening element is attached to a glazing element provided with an edge surface in the surface of the frame part facing the glass sheet. The fastening element is inserted into the gap between the glass sheet and frame part by pushing the fastener into the gap and by rotating the fastener in the gap around an axis perpendicular to the longitudinal direction of the frame part so that the locking projection sets below the said edge surface seen from the direction of the inlet of the gap.

In yet another advantageous embodiment of the method of the invention the fastener with a flexible locking tongue in its fastening element is attached to a glazing element provided with a groove or recess in the surface of the frame part facing the glass sheet. The fastening element is inserted into the gap between the glass sheet and frame part by pushing the fastening element into the gap so that the flexible locking tongue sets to the said groove or recess. When pushing the fastener into the gap, the flexible locking tongue presses itself substantially to a position in direction of the plane of the fastening element so that the fastening element has room to penetrate through the narrow gap between the glass sheet and frame part. When the locking tongue arrives at the groove or recess in the frame part, the locking tongue returns to the original position turning to an angle from the plane of the fastening element. In the position turned to an angle the locking tongue acts as a locking element, which prevents the pulling out of the fastener from the gap between the glass and frame part along a path in direction of the plane of the glass.

In yet another advantageous embodiment of the method of the invention the fastener the fastening element of which is provided with a locking tip protruding from the plane of the fastening element is attached to a glazing element with a groove or recess in the surface of the frame part facing the glass sheet. The fastening element is inserted into the gap between the glass sheet and frame part by pushing the fastening element into the gap so that the locking tip sets into the said groove or recess. The locking tip advantageously has an edge surface turning to an angle from the plane of the fastening element, which skids along the free edge of the frame part as the fastening element is pushed into the gap between the frame part and glass sheet. Upon attaching the fastener, the edge surface forces the fastening element to be pressed against the seal between the glass sheet and fastening element so that the seal is compressed. When the locking tip arrives at the groove or recess in the surface of the frame part, the compressive force of the compressed seal presses the fastening element into the groove or recess of the frame part of the locking tip and thus locks the fastener in place in the frame part. Thus the locking tip acts as a locking element, which prevents the pulling out of the fastener from the gap between the glass and frame part along a path in direction of the plane of the glass. For installing the fastener in place it is preferable that the width of the fastening element is relatively small so that the compressive force applied to the fastening element from the compressing seal is not too big.

An advantage of the invention is that the fastener can be attached fast and easily to a glazing element with a frame without the use of any tools.

A further advantage of the invention is that the fastener attached to the frame does not promote the frame part getting dirty and does not hinder the cleaning of the frame part.

A further advantage of the invention is that no visible traces are left to the frame part or the seal between the frame part and glass sheet from the attachment of the fastener, which would deteriorate the appearance of the frame.

BRIEF DESCRIPTION OF THE DRAWINGS

The invention will next be explained in detail. In the explanation reference is made to the attached drawings, in which.

DETAILED DESCRIPTION OF THE DRAWINGS

Figure 1A:
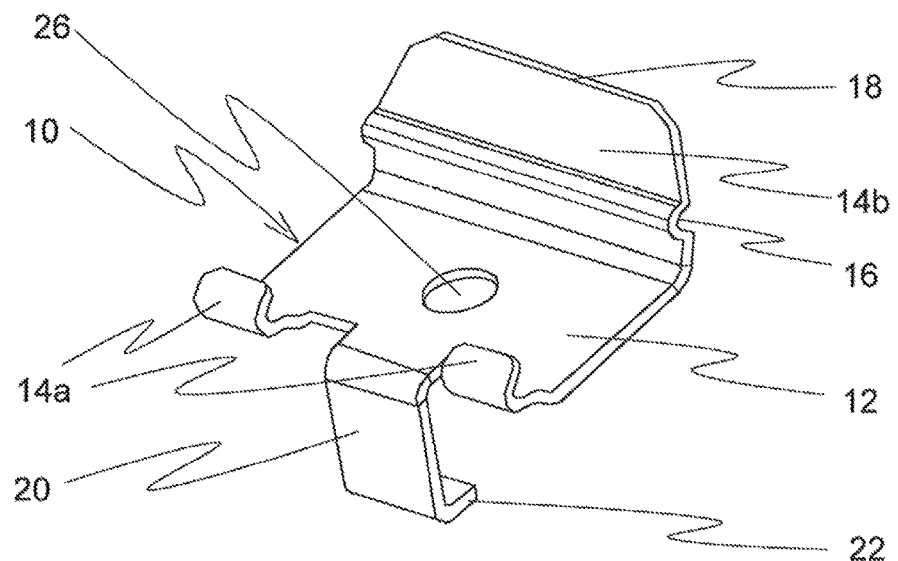
FIG. 1a is an exemplary illustration of a fastener of the invention seen obliquely from above.

FIG. 1a illustrates an example of a fastener of the invention seen obliquely from above. The fastener is a one-piece part made of shaped metal sheet, provided with a support part 10 and fastening element 20. The support part has substantially a flat plate-like base 12, the first edge of which has two first gripping means 14a and the second edge of which is provided with one second gripping means 14b.

The first gripping means are projections protruding from the first edge of the base, which turn slightly upwards from the plane of the base into a first direction and the free edges of which are bent to form a trough. The troughs open towards the second gripping mean 14b in the second edge of the base. The width of the first gripping means 14a is substantially smaller than the width of the base 12, and they are located at the opposite ends of the first edge of the base. Between the first gripping means there is a projection-type fastening element 20, which turns from the plane of the base to a second direction to a substantially right angle in relation to the plane of the base. The free end of the fastening element is turned to a substantially right angle in relation to the plane of the fastening element so that it forms the locking tip 22 to the end of the fastening element.

The second gripping part 14b in the second edge of the base is a planar part of substantially same width as the base, which turns to a first direction from the plane of the base 12, i.e. to the same direction as the first gripping means. Between the free edge 18 of the second gripping mean and the edge connecting to the base there is a groove 16 opening outwards from the fastener, which extends over the width of the entire gripping mean. The groove of the second gripping means and the troughs at the ends of the first gripping means are located at substantially equal distance from the plane defined by the base 12. Between the troughs of the first gripping means and the groove of the second gripping mean there remains a space of substantially constant width, into which the edge rail 50 of the sunshade can be fitted (FIG. 2b). The base 12, its first gripping means 14a continuing from the first edge and the second gripping means 14b continuing from its second edge are made of one thin flexible metal sheet, which bends like an elastic spring when loading it with small loads. The base and the edge parts of the gripping means attaching to the base thus form a spring element between the first gripping means 14a and the second gripping means 14b, owing to which the second gripping means can be bent away from the first gripping means 14a by applying a force to its free edge 18. This makes it possible to fit the edge rail of the sunshade between the gripping means. The base 12 may have one or several holes 26 for attaching the wires belonging to the sunshade.

Figure 1B:
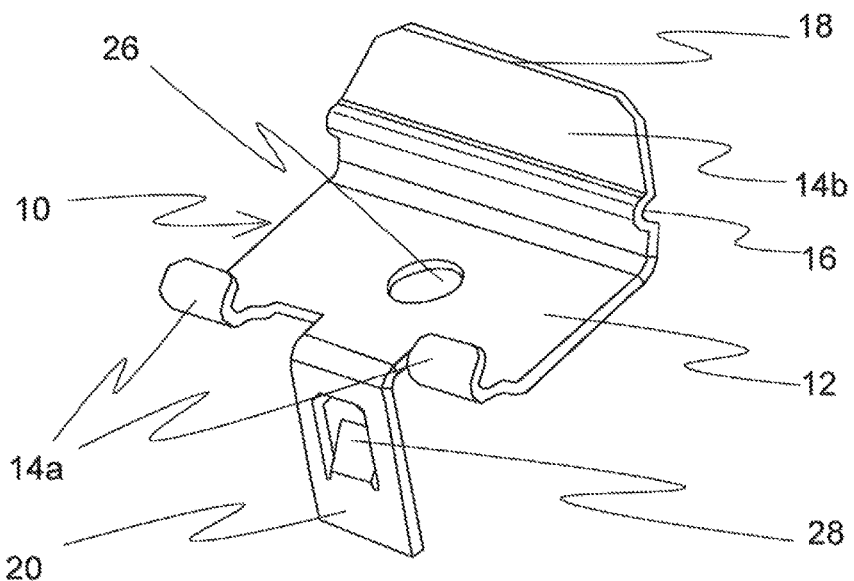
FIG. 1b is an exemplary illustration of an advantageous embodiment of a fastener of the invention seen obliquely from above.

FIG. 1b is an exemplary illustration of one advantageous embodiment of the fastener of the invention, seen obliquely from above. For the support part 10 and the structures belonging to it, this embodiment is identical to the fastener explained in FIG. 1a, but it differs from it for the structure of the fastening element 20. The end of the fastening element has no locking projection, but the free end of the fastening element is substantially straight. Instead of the locking projection, the fastening element has a locking tongue 28, which operates as locking element in the fastener installed in place. The locking tongue is formed by machining a U-shaped groove thorough the fastening element, which defines the locking tongue from the fastening element. The locking tongue is bent to an angle from the plane of the fastening element 20 so that its free edge points towards the base 12. The locking tongue and the fastening element are made of the same thin metal sheet which, when slightly loaded, behaves in a spring-type manner. Because of the spring-type behaviour, the locking tongue can upon loading temporarily move to a position, which is substantially parallel to the fastening element. When no load is applied to the locking tongue, it returns to the position according to FIG. 1b.

The fastener illustrated in FIG. 1b can also be realised so that the flexible locking tongue is replaced by a substantially rigid locking tip. The rigid locking tip can be shaped substantially similarly to the flexible locking tongue shown in FIG. 1b. The rigid locking tip can be manufactured substantially in the same way as the locking tongue by forming the fastening element from a thicker and stronger sheet-type material, which is inflexible in relation to forces used in the installation of the fastener. The locking tongue can also be a closed, wedge-shaped part protruding from the plane of the fastening element.

Figure 2A:
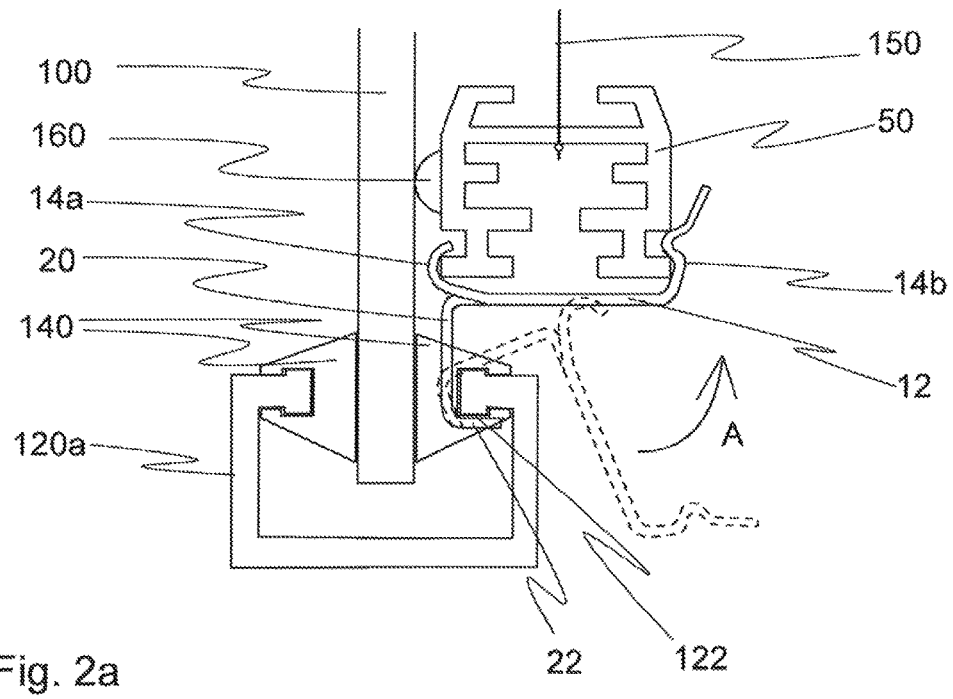
FIG. 2a illustrates the fastener FIG. 1a attached to a glazing element with a frame.
Figure 2B:
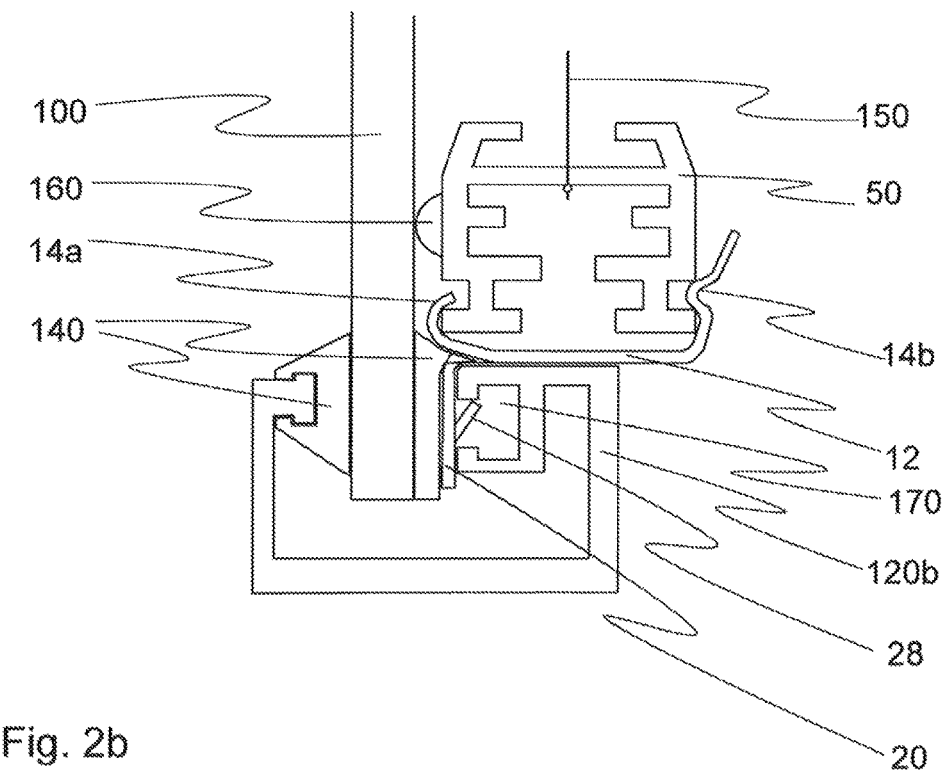
FIG. 2b illustrates an embodiment of the fastener in FIG. 1b attached to a glazing element with a frame.

FIG. 2a illustrates a cross-sectional view of the fastener according to FIG. 1a attached to a balcony glazing. The balcony glazing illustrated in the Figure comprises a glass sheet 100, the upper and lower edges of which have a hollow, through-like edge profile 120a made of aluminum. The edge of the glass sheet extends inside the edge profile, between the longitudinal free edges of the edge profile. Between the free edge of the edge profile and the surface of the glass sheet 100 there is an elastic seal 140. The seal has a fastening groove, to which the free edge of the edge profile 120a is fitted. The seal is not fixedly attached to the glass sheet or edge profile, but it remains in place between the glass sheet and edge profile due to the compression force caused by the tight fit and the compatible shape of the fastening groove of the seal and the free edge of the edge profile. The edge profile of the glazing can also be called the frame part.

The fastener of the invention is attached in place to the edge profile by turning it first to the position shown by a broken line in FIG. 2a and by fitting the locking projection 22 at the end of the fastening element 20 into the gap between the seal and edge profile. After this the fastener is pushed forwards in the longitudinal direction of the fastening element and rotated simultaneously around an axis parallel to the longitudinal direction of the edge profile 120a in the direction pointed by the arrow A so that, the fastener sets to the position shown by an unbroken line in FIG. 2a. In this position the locking projection 22 at the end of the fastening element of the fastener sets below the internal edge surface 122 at the free edge of the edge profile. The seal 140 between the glass sheet and edge profile is elastic and deforms in the installation phase of the fastener so that it is possible to install the fastener in place.

The edge rail 50 of the sunshade can be attached to the fastener installed in place by fitting the edge rail between the first gripping means 14a and the second gripping means 14b. The side surfaces of the edge rail have grooves for attachment, to which the protruding parts of the gripping means can be fitted. The edge rail stays in place in the fastener because of the compression force generated by the spring element between the gripping means. The number of fasteners used for attaching one edge rail can be chosen freely. The edge rail is typically attached in place with two fasteners, which are located near the ends of the edge rail. The fasteners can also first be attached to the edge rail, after which all fasteners are attached in place at once by properly moving and rotating the edge rail. If clearly more load is applied to the edge rail than in a common situation of use of the sunshade, the edge rail detaches from the fasteners. This prevents e.g. accidents caused by one getting entangled in the wires of the sunshade.

FIG. 2a illustrates the attachment of the edge rail of the sunshade to the edge profile in the lower edge of the balcony glazing. The attachment of the edge rail to the edge profile of the upper edge of the glazing is done in a respective manner. When the edge rails are attached in place to the edge profiles, conductor wires 150 connecting the edge rails are installed in place. The tightly installed conductor wires pull the edge rails towards each other and force the fasteners to the position according to FIG. 2a. A pulling force in the direction of the plane of the glass sheet is applied to the fastener from the conductor wires. However, the locking projections at the ends of the fastening elements prevent the fastener from moving to the direction of the pulling force of the conductor wire so that the fasteners and the edge rails of the sunshade attached to these remain in place. In FIG. 2a, there is a small gap between the side surface of the edge rail 50 and the glass sheet 100. Small elastic pads 160 can be arranged to the side surface of the edge rail, by means of which the edge rail is supported to the glass sheet by its side surface.

FIG. 2b is a cross-sectional view of an advantageous embodiment of the fastener according to FIG. 1b, attached to the balcony glazing. The balcony glazing illustrated in FIG. 2b comprises the glass sheet 100, the upper and lower edges of which have a hollow, trough-like edge profile 120b made of aluminum. The cross-sectional shape of the edge profile differs somewhat from the cross-sectional shape of the edge profile of the balcony glazing shown in FIG. 2a. The surface of the edge profile setting against the glass sheet of the profile has a groove 170 in the longitudinal direction of the profile, the mouth of which opens towards the surface of the glass sheet 100. The seal 140 between the free edge of the edge profile and the glass sheet has a similar functioning and fastening principle to that in FIG. 2b, even though it has a different cross-sectional shape.

The advantageous embodiment of the fastener illustrated in FIG. 1b is attached in place to the edge profile by fitting the point of the fastening element between the seal 140 and the free edge of the edge profile and by pushing the fastener towards the edge profile 120b following the direction of the plane of the glass sheet 100. As the fastener moves forward, the locking tongue 28 is pressed to a position substantially parallel of the plane of the fastening element at the free edge of the edge profile. When the locking tongue arrives at the groove 170, it returns to its original position, in which it is at an angle in relation to the plane of the fastening element. The fastening element and the locking tongue have been dimensioned so that as the locking tongue sets into the groove 170, the base of the fastener sets against the surface of the edge profile 120b. Thus, there remains no notable gap between the base of the fastener and the surface of the edge profile.

A fastener provided with the rigid locking tip is installed in place practically in the same manner as a fastener provided with a flexible locking tip. Upon attaching the fastener, the edge surface of the locking tip forces the fastening element to be pressed against the seal between the glass sheet and fastening element so that the seal is compressed. When the locking tip arrives at the groove or recess in the surface of the frame part, the compression force of the compressed seal presses the tip of the fastening element into the groove or recess of the frame part of the locking tip and thus locks the fastener in place to the frame part.

In FIG. 2b there is a narrow gap between the side surface of the edge rail 50 and the glass sheet 100. Small elastic pads 160 can be arranged to the side surface of the edge rail, by means of which the edge rail supports itself to the glass sheet from its side surface. The pads may, for example, be adhesive or sticker bonded elastic pieces. The pads supporting themselves to the surface of the glass sheet prevent the fastener from rotating around the longitudinal axis of the edge profile and the support part of the fastener from moving towards the glass sheet, which assists in keeping the elastic locking tongue or rigid locking tip in the groove 170.

The edge rail of the sunshade is attached to the fasteners in a similar way as in the explanation in FIG. 2a. A force pulling in the direction of the plane of the glass sheet is applied to the fastener from the conductor wires of the sunshade. The locking tongues in the fastening elements function as locking elements, which prevent the fastener from moving in the direction of the pulling force of the conductor wire so that the fasteners and the edge rails of the sunshade attached to these remain in place in the edge profile.

Some advantageous embodiments of a fastener and method according to the invention have been illustrated above. The invention is not restricted to the explained solutions, but the inventional idea can be applied in different ways within the limits defined by the patent claims.

The invention claimed is:

1. A fastener for attaching to a glazing element having a glass sheet, a frame, and a gap defined between the glass sheet and the frame, the fastener comprising:
   a support part having a first gripping means and an opposite, second gripping means for attaching to an edge rail of a sunshade; and
   a fastening element extending from the support part and having a locking element that projects toward the support part, wherein when the fastening element is inserted into the gap the locking element extends toward and engages an interior surface of the frame on a same side of the glass sheet as the support part and locks the fastening element to the frame.

2. The fastener according to claim 1, wherein the locking element is a locking tip that perpendicularly projects from the fastening element.

3. The fastener according to claim 2, wherein the locking tongue elastically deforms as the fastening element is inserted into the gap.

4. The fastener according to claim 3, wherein the support part has a base that defines a plane, and wherein the first and second gripping means project in a first direction away from the plane and the fastening element projects in an opposite, second direction away from the plane.

5. The fastener according to claim 4, wherein the support part has a spring element that permits the first gripping means and the second gripping means to move relative to each other and thereby engage the edge rail of the sunshade.

6. The fastener according to claim 5, wherein one of the first and second gripping means has a groove that outwardly opens away from the base and the other of the first and second gripping means has a projection that inwardly projects toward the base.

7. The fastener according to claim 1, wherein the locking element is a locking tongue formed of a section of the fastening element that is bent out of plane relative to the fastening element.

\* \* \* \* \*